July 9, 1957 W. G. HALL ET AL 2,798,970

SQUARE WAVE PHASE SHIFTER

Filed March 14, 1955 2 Sheets-Sheet 1

WITNESSES:

E. A. McCloskey

T. H. Murray

INVENTORS
William G. Hall
and Robert I. Van Nice.
BY
F. E. Browder
ATTORNEY

July 9, 1957 W. G. HALL ET AL 2,798,970

SQUARE WAVE PHASE SHIFTER

Filed March 14, 1955 2 Sheets-Sheet 2

United States Patent Office 2,798,970

Patented July 9, 1957

2,798,970

SQUARE WAVE PHASE SHIFTER

William G. Hall, Wilkinsburg, and Robert I. Van Nice, Pittsburgh, Pa., assignors to Westinghouse Electric Corporation, East Pittsburgh, Pa., a corporation of Pennsylvania Application March 14, 1955, Serial No. 494,212

12 Claims. (Cl. 307—106)

This invention relates to phase shifters and more particularly to a phase shifter whose output is a square wave shifted with respect to a reference square wave by an angle determined by a control voltage.

Several different arrangements have heretofore been devised for shifting the phase of a sine wave signal. For example, one well known device for shifting a sine wave does so by the steps of (1) applying an input sine wave across the series combination of a variable resistance and a capacitor and (2) varying the value of the resistance to produce an output signal across the capacitor which is shifted in phase with respect to the original signal by an amount determined by the value of the resistance. Other devices have also been devised for shifting the phase of the sine wave. These devices, however, are not satisfactory for square wave signals since they all employ reactive elements which cause distortion of the input square wave form.

Accordingly, it is a primary object of our invention to provide novel apparatus for shifting a square wave signal without distortion. Basically, this apparatus shifts the phase of the square wave signal by adding a reference square wave signal in phase opposition with a second signal comprising a series of rectangular voltage pulses of double the amplitude of the reference signal. As will become apparent from the following description, varying the pulse width of the second signal will produce a resultant output square wave signal which is shifted in phase with respect to the reference signal by an amount determined by the pulse width of the second signal.

It is another object of our invention to provide a number of devices for shifting the phase of a square wave signal which are simple and rugged in construction.

The structural details of these devices, together with further objects and features of our invention, will become apparent from the following description taken in connection with the accompanying drawings which form a part of this specification, and in which.

Figure 1:
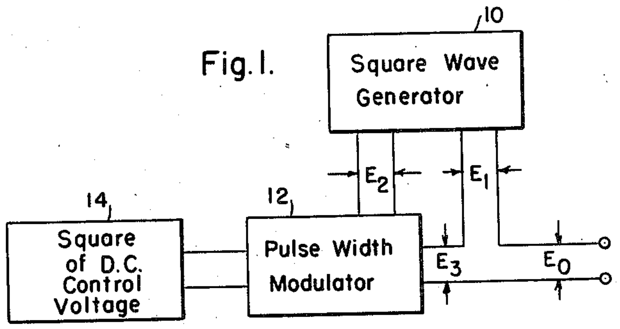
Figure 1 is a block diagram of the basic apparatus for shifting the phase of a square wave signal.
Figure 2:
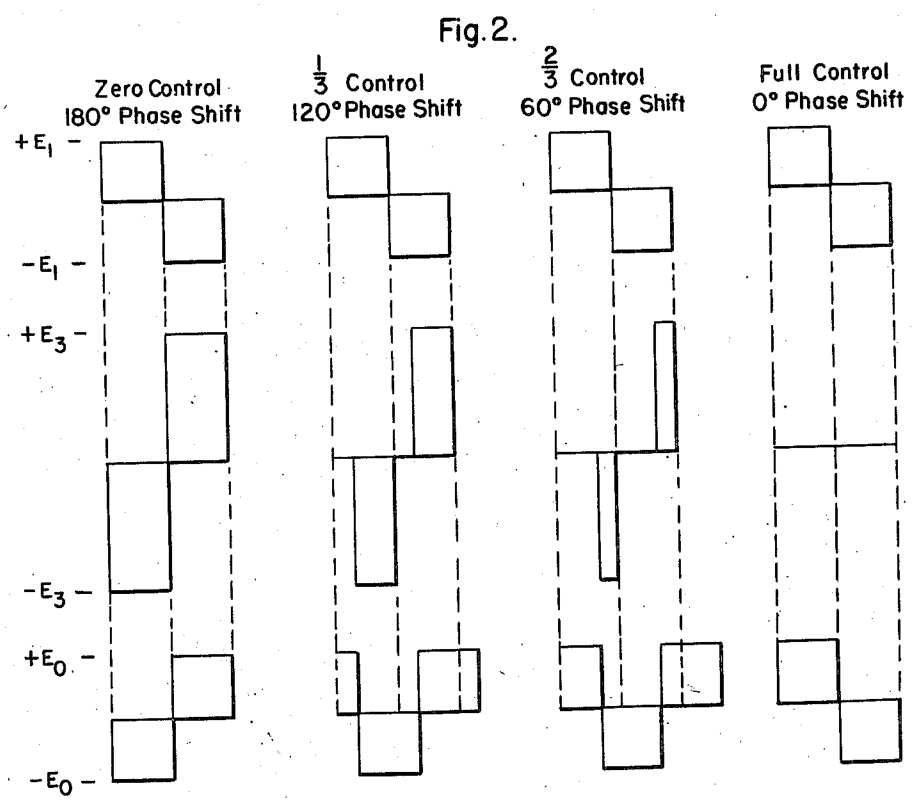
Fig. 2 is a graphical illustration of our method for shifting a square wave signal.

Referring to Figs. 1 and 2, a square wave generator 10 provides two separate output square wave signals $E_1$ and $E_2$ which may be in phase or 180° out of phase with respect to each other. $E_1$ is shown as the first square wave form in Fig. 2. $E_2$, not shown in Fig. 2, is fed to a pulse width modulator 12 which modifies this signal to produce an output square wave signal $E_3$. As defined herein, a "square wave signal" is any one which shifts abruptly from one voltage level to another to form a square or rectangular pattern when signal amplitude is plotted against time. In Fig. 2 it can be seen that the square wave signal $E_3$ is inverted in phase with respect to $E_1$ and has an amplitude double that of $E_1$. In most cases the signal $E_2$, which is fed to modulator 12, will have an amplitude equal to that of $E_1$; and, therefore, modulator 12 must include means for amplify- $E_2$ to produce $E_3$. If desired, however, $E_2$ may have an amplitude double that of $E_1$, in which case amplification is not necessary in the modulator. The duration or width of the output square wave voltage pulses from modulator 12 is directly proportional to a D. C. control voltage supplied from variable voltage source 14. As the control voltage advances from zero to a maximum, the pulse width decreases progressively as illustrated. The cycle duration of signals $E_1$ and $E_3$, however, is always the same regardless of the pulse width of $E_3$. That is, the time elapse of the complete 360° cycle of signal $E_1$ is always equal to the time elapse of the 360° cycle of signal $E_3$. It is important to note that the trailing edges of the positive and negative square wave voltage pulses of signal $E_3$ remain at the 180° and 360° positions of the cycle $E_1$ and $E_3$ regardless of the magnitude of the D. C. control voltage. In this way, one of the voltage pulses will extend from $(0+X)°$ to 180° and the other will extend from $(180+X)°$ to 360°, where X is a decrease in pulse width measured in degrees.

$E_3$ is added in series with $E_1$, as shown in Fig. 1, to produce the output square wave signal $E_0$ of Fig. 2. $E_0$, being the algebraic sum of $E_1$ and $E_3$, is a square wave shifted in phase with respect to $E_1$ by an amount dependent upon the width of the voltage pulses of $E_3$. This width is, in turn, dependent upon the magnitude of the D. C. control voltage from source 14. Since $E_3$ has an amplitude double that of $E_1$ and since the two signals are added in phase opposition, the resultant output signal will have an amplitude equal to that of $E_1$. It can be seen by the various wave forms illustrated in Fig. 2 that as the control voltage increases progressively, the phase shift decreases progressively from 180° to 0°.

Briefly then, the method consists of (1) generating first and second square wave signals, (2) modifying the second square wave signal so that it is 180° out of phase with respect to the first signal and has an amplitude double that of the first signal, (3) varying the pulse width of the second signal in response to variations in a D. C. control voltage, and (4) adding said first and second signals in phase opposition to produce an output square wave signal which is shifted in phase with respect to said first signal.

Figure 3:
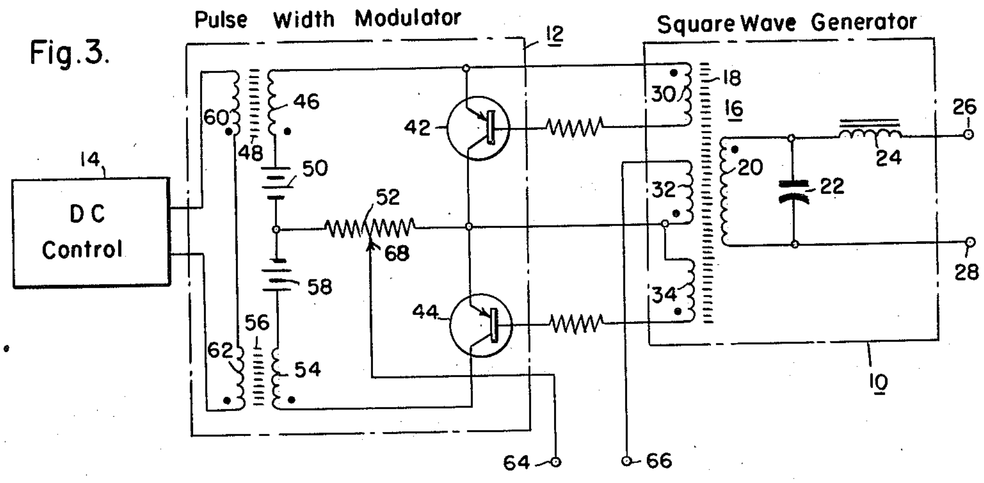
Fig. 3 is a detailed schematic diagram of one type of phase shifter which may be used to effect the process illustrated in Fig. 2.

One possible device or apparatus for carrying out the process illustrated in Fig. 2 is shown in detail in Fig. 3.

The square wave generator 10 in this instance is, in part, the subject matter of copending application Serial No. 335,335, filed February 3, 1953, now Patent No. 2,763,827, and assigned to the assignee of the present application. It comprises a transformer 16 having a magnetic core member 18, preferably formed from substantially rectangular hysteresis loop core material. In order to magnetically saturate the core member 18 in accordance with variations in an applied input voltage, a primary winding 20 is disposed in inductive relationship with the core member 18. As illustrated, a capacitor 22 is connected in parallel circuit relationship with the primary winding 20 of the transformer 16, the parallel circuit being electrically connected through a linear inductance member 24 to input terminals 26 and 28. The input terminals are supplied with a source of alternating current voltage, not shown. In order to insure that the alternating current source presents a high impedance to the combination of winding 20 and capacitor 22, the linear inductance member 24 is connected between input terminal 26 and one side of capacitor 22. It is to be understood that a resistor could be substituted for inductance member 24; however, it woud consume considerably more power.

Primary winding 20 and capacitor 22 form a ferroresonant circuit, and the relationship of these elements is such that when a source of alternating current voltage is applied to terminals 26 and 28 a substantially square wave signal will appear across secondary windings 30, 32, and 34. Since the square wave generator *per se* forms no part of the present invention and since any suitable square wave generator may be used in its place, a further detailed description of the operation and theory of the generator is not included herein.

The pulse width modulator 12 in Fig. 3 includes a pair of junction transistors 42 and 44. The emitter-to-collector circuit of transistor 42 includes the secondary winding 46 of saturable core transformer 48, battery 50, and a load resistor 52. Likewise, the emitter-to-collector circuit of transistor 44 includes the secondary winding 54 of saturable core transformer 56, battery 58, and the common load resistor 52. Like transformer 16, the cores of transformers 48 and 56 are made of substantially square hysteresis loop material. The corresponding relative polarities of the windings on the various transformers of the square wave generator and pulse width modulator are indicated by dots. Note that the relative polarity across secondary winding 30 is opposite to that across winding 34. Transistors 42 and 44 are both of the PNP type in the embodiment shown. However, they may be NPN transistors, if desired. In accordance with the well known theory of operation of junction transistors, an NPN transistor will conduct current in the conventional sense from emitter to collector when its base is positive with respect to its emitter. On the other hand, a PNP transistor will conduct current from emitter to collector when its base is negative with respect to its emitter. Since the square wave signals across windings 30 and 34 are 180° out of phase, and since transistors 42 and 44 are of the same type, it is apparent that the transistors will be alternately switched on and off. For example, if it is assumed that PNP transistors are used, the base of transistor 42 will be negative with respect to its emitter on one half cycle, thereby permitting current flow through the transistor; and the base of transistor 44 will be negative with respect to its emitter on the other half of the cycle, thereby permitting current flow therethrough.

As an alternative, transistors 42 and 44 could be complementary PNP and NPN junction transistors. In this case, the square wave signals across secondary windings 30 and 34 will be in phase to effect the alternate switching action of the transistors.

The primary windings 60 and 62 of transformers 48 and 56 are connected to the high impedance source of direct current 14. When the control current applied to secondary windings 60 and 62 is zero, the voltage of batteries 50 and 58 is of sufficient magnitude to saturate the cores of transformers 48 and 56; and, therefore, substantially all of the voltage from batteries 50 and 58 will alternately appear across resistor 52 as transistors 42 and 44 are switched on and off. As the control current is increased, the cores of transformers 48 and 56 reset to a condition of unsaturation during the half cycle that their associated transistors are cut off. During the next half cycle when transistor 44, for example, conducts, its associated transformer 56 will not saturate immediately because of the flux reset caused by the control current from source 14; and, therefore, substantially all of the voltage from battery 58 will appear across secondary winding 54 of the transformer which now has a higher impedance than resistance 52. As a result, the load voltage will be substantially zero until the flux density of the core of transformer 56 raises to a point where the core saturates, at which time the load voltage jumps to that of the supply voltage of battery 58. In other words, transformer 56 will not saturate until the volt-second integral $\int edt$ equals the flux charge required to saturate the core. This factor is, in turn, dependent upon the magnitude of the control current from source 12. In a similar manner, the saturation of transformer 48 is controlled when transistor 43 conducts. When full control current is applied, the cores remain unsaturated during a complete half cycle and the modulator output voltage remains at zero.

The secondary winding 32 of transformer 18 is connected in series with at least a portion of resistor 52 so that the resultant square wave output of the phase shifter appears across output terminals 64 and 66. The position of tap 68 on resistor 52 may be conveniently adjusted so that the peak voltage across resistor 52 is double that across secondary winding 32. It can be seen that the voltage across resistor 52 is 180° out of phase with that across winding 32 and has its pulse width modulated in accordance with variations in the control current from source 12. The resultant output signal is, therefore, a square wave which is shifted in phase with respect to the signal appearing across secondary winding 32.

Figure 4:
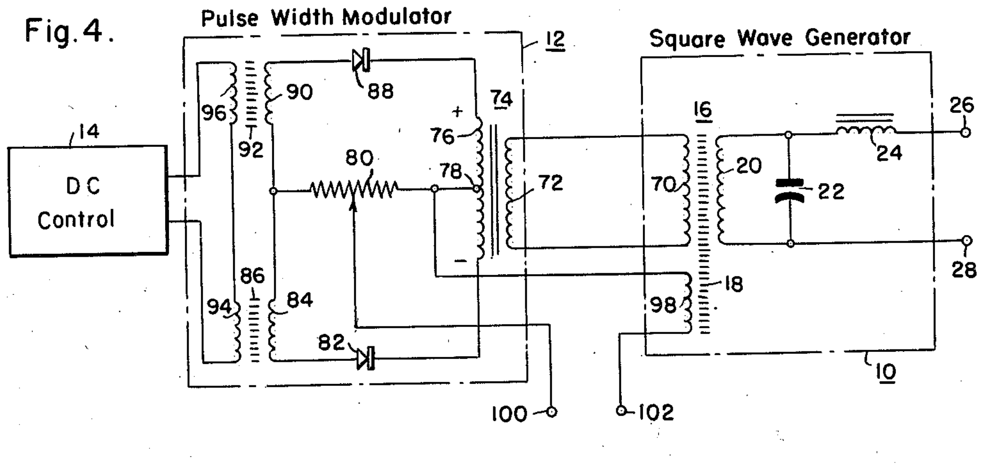
Fig. 4 is a schematic diagram of another type of phase shifter which may be used to achieve the process illustrated in Fig. 2.

The phase shifter of Fig. 4, like that of Fig. 3, is made up of the basic elements of a square wave generator 10 and a pulse width modulator 12. The square wave generator is identical to that of Fig. 3, having corresponding elements identified by like numerals. In this case, however, only two secondary windings are inductively coupled to the core 18 of transformer 16. The voltage across secondary winding 70 is applied to the primary winding 72 of a second transformer 74 which has a secondary winding 76 inductively coupled to its core. To the midpoint 78 of winding 76 is connected a load resistor 80. The voltage appearing across the bottom half of winding 76 is applied across resistor 80 through rectifier 82 and the secondary winding 84 of a saturable core transformer 86. Likewise, the voltage across the top half of secondary winding 76 is applied across resistor 80 through rectifier 88 and the secondary winding 90 of a saturable core transformer 92. Transformers 86 and 92 are provided with primary windings 94 and 96 which are connected to a source of direct control current 14. On one half cycle of the square wave voltage appearing across winding 72, the lower end of winding 76 will be negative with respect to midpoint 78 as shown, and the upper end will be positive with respect to midpoint 78. Rectifier 82 will, therefore, conduct and a square wave voltage pulse of one polarity will appear across the resistor 80. Rectifier 88, however, will block current flow during this half cycle. On the next half cycle, the polarities on winding 76 will be opposite to those shown in the drawing; and therefore, rectifier 88 will now conduct to produce a square wave voltage pulse across resistor 80 which has a polarity reversed with respect to the polarity of the preceding pulse. On this half cycle, rectifier 82 will block current flow. Transformers 86 and 92 are wound on cores of square hysteresis loop material and serve the same function as transformers 48 and 56 in the embodiment shown in Fig. 3. When the control voltage is zero, the transformers 86 and 92 are saturated and, therefore, substantially all of the voltage across one half of this winding will appear across load resistor 80 as rectifiers 82 and 88 alternately conduct. As the control current increases, the time required for the cores of transformers 86 and 92 to saturate upon the application of voltages from transformer 74 increases progressively; and, therefore, the pulse width of the signal appearing across resistor 80 is decreased progressively. At least a portion of the voltage across load resistor 80 is added in phase opposition with the voltage across secondary winding 98 to produce a resultant output square wave signal across output terminals 100 and 102 which is shifted in phase with respect to the signal appearing across winding 98.

Figure 5:
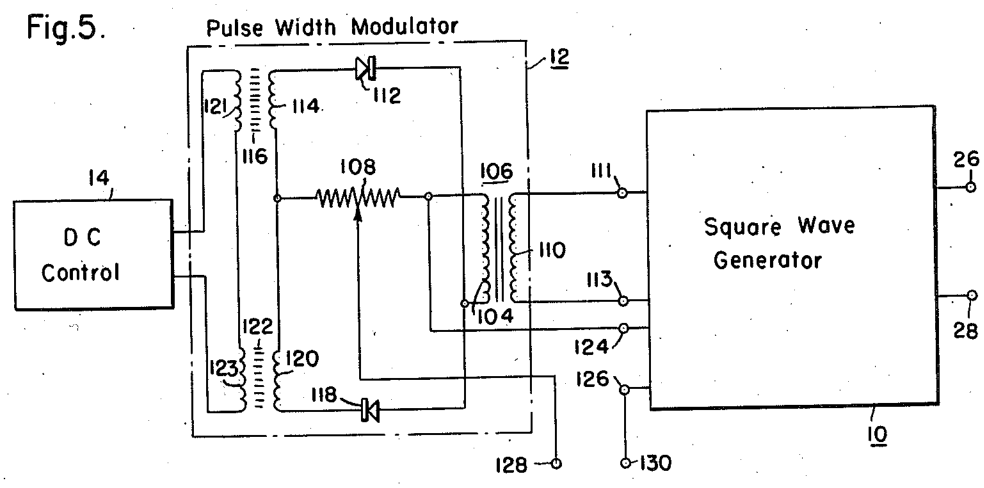
Fig. 5 is a schematic diagram of still another type of phase shifter which may be used to achieve the process of Fig. 2.

In Fig. 5 the square wave generator 10 of the phase shifter is shown in block form only. The pulse width modulator in this case is similar to that shown in Fig. 5. The secondary winding 104 of a coupling transformer 106 is connected in series with a load resistor 108. A square wave signal from generator 10 appearing across terminals 111 and 113 is applied to the primary winding 110 of transformer 106. Two parallel current paths are provided between the ends of the series combination of resistor 108 and secondary winding 104. One of these paths includes rectifier 112 and the secondary winding 114 of saturable core transformer 116, and the other path includes rectifier 118 and the secondary winding 120 of saturable core transformer 122. The primary windings 121 and 123 of transformers 116 and 122 are connected to a source of D. C. control voltage 14 to control the pulse width of the square wave produced across resistor 108 in the manner described in connection with the embodiments shown in Figs. 3 and 4.

On one half cycle of the applied square wave signal rectifier 112 will conduct to produce a square wave voltage pulse of one polarity across resistor 108, the width of this pulse being determined by the magnitude of the control current from source 14. On the next half cycle, rectifier 118 will conduct to produce a similar square wave voltage pulse of opposite polarity. As in the previous embodiments, a portion of the voltage across resistor 108 is added in phase opposition with the square wave signal across terminals 124 and 126 of generator 10 to produce a resultant output square wave pulse across output terminals 128 and 130 which is shifted in phase with respect to the signal across terminals 124 and 126.

Although we have described our invention in connection with certain specific embodiments, it will be apparent to those skilled in the art that various changes in form and arrangement of parts can be made to suit requirements without departing from the spirit and scope of the invention. In this respect, it should be apparent that any suitable square wave generator can be used in conjunction with any pulse width modulator to accomplish the phase shift method described herein.

We claim as our invention:

1. In combination, a square wave generator providing three separate square wave signals, a pulse width modulator equipped with a pair of junction transistors, means for applying a first of said square wave signals between the emitter and base of one of said transistors, means for applying a second of said square wave signals between the emitter and base of the other of said transistors, a common load for said transistors, means for varying the emitter-to-collector current through said transistors, and means for adding at least a portion of the voltage across said common load with the third of said square wave signals from said square wave generator to produce an output square wave signal.

2. The combination claimed in claim 1 wherein the means for varying the emitter-to-collector current through said transistors comprises a pair of saturable inductors, each of said inductors being included in the external collector-to-emitter circuit of one of said transistors, and a direct current control voltage for varying the flux density of said inductors.

3. In combination, a square wave generator providing a plurality of square wave output signals, a plurality of transistors, means for applying each of said output signals except one between the emitter and base of an associated one of said transistors, a common load for said transistors, means for varying the impedance presented to the emitter-to-collector current through said transistors, and means for adding at least a portion of the voltage across said common load with the one square wave output signal which is not applied between the emitter and base of a transistor to produce a resultant square wave signal.

4. In combination, a square wave generator providing at least two output square wave signals, a device for modulating the width of a square wave signal in response to variations in a direct current control voltage, means for applying at least one of said output square wave signals to said device as an input signal, and means for adding the modulated square wave signal from said device with one of said output signals from said generator to produce a resultant square wave signal.

5. The combination claimed in claim 4 wherein the modulating device includes amplifying means for producing a modulated signal of double the amplitude of the square wave signal with which it is added.

6. In combination, a square wave generator providing a plurality of output square wave signals, an electrically controlled device for modulating the width of a square wave signal in response to variations in a direct current control voltage, means for applying at least one of said output square wave signals to said device as an input signal, and means for adding the modulated square wave signal from said device with one of the output signals from said generator to produce a resultant square wave signal.

7. In combination, a square wave generator providing a plurality of output square wave signals, a device for modulating the width of a square wave signal in response to variations in a control voltage, means for applying at least one of said output square wave signals to said device as an input signal, means for amplifying said input signal, and means for adding the modulated square wave signal from said device with one of said output signals from said generator in phase opposition.

8. In combination, a square wave generator providing a plurality of output square wave signals, a pulse width modulator coupled to said generator, said modulator having a pair of amplifying devices included therein, a common load for said amplifying devices, and means for adding at least a portion of the voltage across said common load with one of the output square wave signals from said generator in phase opposition to produce a resultant square wave signal.

9. The combination claimed in claim 7 wherein the modulator includes means responsive to a control voltage for varying the pulse width of an applied signal.

10. In combination, a square wave generator providing at least two separate output square wave signals, a transformer having primary and secondary windings, means for applying one of said square wave output signals across said primary winding, a resistor having one end connected to the mid-point of said secondary winding, a first rectifier and a first inductor connecting one end of said secondary winding to the end of said resistor which is not connected to said mid-point, a second rectifier and a second inductor connecting the other end of said secondary winding to the said other end of said resistor, means for selectively saturating said first and second inductors, and means for adding at least a portion of the voltage across said resistor with one of said square wave signals from said generator to produce a resultant square wave signal.

11. In combination, a square wave generator providing at least two separate output square wave signals, a transformer having primary and secondary windings, means for applying one of said square wave output signals across said primary winding, an impedance element connected in series with said secondary winding, a first electron path connecting the opposite ends of the series combination of said secondary winding and said impedance elements and including a first rectifier and a first inductor, a second electron path connecting said opposite ends and including a second rectifier and a second inductor, means for selectively saturating said first and second inductors, and means for adding at least a portion of the voltage across said resistor with one of said square wave signals from said generator to produce a resultant square wave signal.

12. In combination, a square wave generator providing at least two output square wave signals, a device responsive to one of said square wave signals for modulating the width of the square wave signal applied thereto, and means for adding a modulated square wave signal from said device with one of the output signals from said generator to produce a resultant square wave signal.

No references cited.